219-121
6/12/79 OR 4,158,123 SR

United States Patent [19]

New

[11] 4,158,123

[45] Jun. 12, 1979

[54] SERIES REACTOR

[75] Inventor: George W. New, Stockton-on-Tees, England

[73] Assignee: Tioxide Group Limited, Billingham, England

[21] Appl. No.: 655,103

[22] Filed: Feb. 4, 1976

[30] Foreign Application Priority Data

Feb. 28, 1975 [GB] United Kingdom ............... 08571/75

[51] Int. Cl.[2] .......................... B23K 9/00; H01F 27/08

[52] U.S. Cl. .................................. 219/121 P; 336/12; 336/62

[58] Field of Search .............. 219/121 P; 336/62, 180, 336/84, 10, 12, 5, 232, 57; 361/20, 118

[56] References Cited

U.S. PATENT DOCUMENTS

| | | | |
|---|---|---|---|
| 649,086 | 5/1900 | Varley | 336/180 |
| 2,139,443 | 12/1938 | Craymer | 336/62 X |
| 2,312,140 | 2/1943 | Welch, Jr. | 336/5 X |
| 2,497,516 | 2/1950 | Phelps | 336/62 |
| 2,782,386 | 2/1957 | Cornell | 336/62 X |
| 3,195,083 | 7/1965 | Wetherill | 336/12 |
| 3,212,040 | 10/1965 | Gibson | 336/12 X |
| 3,443,119 | 5/1969 | Norton | 336/5 X |
| 3,463,903 | 8/1969 | Rudaz | 336/5 X |
| 3,503,026 | 3/1970 | Geisel et al. | 336/62 |
| 3,728,655 | 4/1973 | Reinke | 336/62 |

FOREIGN PATENT DOCUMENTS

| | | | |
|---|---|---|---|
| 1049007 | 1/1959 | Fed. Rep. of Germany | 336/62 |

*Primary Examiner*—E. A. Goldberg
*Assistant Examiner*—Mark Paschall
*Attorney, Agent, or Firm*—Schuyler, Birch, Swindler, McKie & Beckett

[57] ABSTRACT

An improved multiphase series reactor consisting of a number of interconnected coils, each coil being formed from sub-coil wherein the sub-coils consist of a number of laterally-spaced single-plane spirals, each spiral being formed from hollow electrical-conducting material. Each sub-coil is wound in such a manner that electrical power supplied to the coils passes through the constituent spirals of the sub-coils in the same direction. Coolant introduced into the interior of the hollow-electrical conducting material passes through the spirals of the sub-coils before being withdrawn.

8 Claims, 4 Drawing Figures

SERIES REACTOR

The present invention relates to improved series reactors suitable for controlling the power supply to an unstable electrical load.

Series reactors are particularly suitable for controlling the power supply to such an unstable electrical load, e.g. that required by a continuously operating arc, since the response of the series reactor in re-stabilising the power supply after a random variation in the load, for example in the resistance of the arc, is extremely rapid. Furthermore, the speed of response is increased with an increasing number of phases in the power supply, for example from 3 to 6. However, presently available series reactors suffer from several disadvantages. They are, for example, exceedingly heavy and bulky pieces of equipment since they are associated with large volumes of oil (as a coolant) together with containing vessels (including a surge tank(s)), radiators (for cooling the oil) and explosion detection and venting apparatus. Because of this, a presently available series reactor suitable for the control of a power supply of the order of, say, 4000 kVA may weigh as much as 60 tons. Basically, as noted above, this weight is determined by the necessity for providing external cooling of the coils of the reactor by means of a special oil, in particular by the large volume of oil required if adequate cooling is to be obtained, and the equipment associated with the oil. In addition, the presence of the oil surrounding the coils also requires that the oil be removed, i.e. drained off, before access to the coils can be obtained. It will also be appreciated that the great weight of a series reactor for the control of a large power supply is such that it may be impossible, in many cases, to site the reactor adjacent the electrical load to be supplied and this may lead to a substantial financial penalty in the use of high cost special cables between the reactor and the load to be supplied.

It is an object of the present invention to provide a series reactor which at least reduces some of the mentioned above. mentioned above Accordingly, the present invention is a multiphase series reactor for controlling the power supply to an unstable electrical load which comprises a number of interconnected coils surrounding air-filled cores, each coil being formed from a number of sub-coils, each sub-coil consisting of a plurality of laterally-spaced, single-plane spirals, each spiral being formed from hollow, electrically-conducting material, each sub-coil being wound in such a manner that electrical power supplied to the coil passes through the constituent spirals of the sub-coils in the same direction and coolant introduced into the interior of the hollow electrically conducting material forming a sub-coil passes through the spirals of the sub-coil before being withdrawn therefrom; means to introduce coolant through the interior of each sub-coil and to withdraw coolant therefrom and means for connecting the coils to a common power source and to an electrical load.

The 'control time' or speed of response of a series-reactor to random variations in the electrical load depends partly upon the number of phases in the power supply and the relationship may be expressed by the term L/nR where 'L' is the inductance of the series reactor, 'R' is the resistance of the unstable electrical load and 'n' is the number of phases in the power supply. It will be appreciated, therefore that, say, a change from 3 phase current to 6 phase current will result in a control time which is twice as rapid i.e. the series reactor will respond in half the time, and since the more rapid the response to re-stabilise the electrical load the better, multiphase series reactors are required, particularly when controlling the power supply to an arc wherein very rapid variation in the resistance of the arc may cause interruption of the arc in the absence of rapid re-stabilisation.

By the term "air-filled core", as is well-known in the art, is meant a core which does not consist of a magnetically susceptible metal. It may, for example, consist of an organic polymer such as that shown in FIG. 4 of the drawings.

The reactor comprises a number of interconnected coils each of which surrounds an air-filled core and which are normally connected in groups, for example as shown in the drawings, and the end connections for each coil are normally to terminals for convenience in connecting the series reactor into the circuit in the desired manner. In addition to the electrical connections, each coil or sub-coil is connected to a supply of liquid coolant, for example water, in such a manner that coolant can be introduced into the interior of one end of the hollow electrically-conducting material forming the coil or sub-coil and withdrawn from the other end.

The coils are made up of a number of sub-coils which are interconnected within the coil in such a manner that power passing through the coils passes through each sub-coil (and through each constituent spiral thereof) in the same direction thereby ensuring that the maximum magnetic flux is developed in the cores surrounded by the coils. The sub-coils are also preferably connected in such a manner that liquid coolant can be introduced into one end of the hollow electrically conducting material forming the spirals of the sub-coil and can pass through at least two of the spirals before being withdrawn. If the sub-coil consists of more than two spirals, for example less preferably of 4 or 6, then they may be so-connected that the coolant passes through all the constituent spirals thereof before being withdrawn. It may be preferred, for safety, that the coolant-carrying pipes are connected to the hollow electrically conducting material forming the spirals, sub-coils and/or coils by electrically non-conducting connections thereby insulating the coolant pipe from the electrical power supply.

The hollow electrically-conducting material forming the spirals, sub-coils and coils is normally hollow metal tubing, for example hollow copper tubing, and it is preferred that it has a rectangular, for example a square, outer cross-section (to facilitate winding and efficient magnetic flux generation) and a central passage of circular cross-section for the coolant.

Tubing between 5 to 13 mm wide (externally) and having an internal passage diameter in the range 2.5 mm to 5 mm is particularly suitable. The ends of the windings of adjacent sub-coils can, if desired, conveniently be secured in common hollow blocks of electrically-conducting material which can serve both as electrical connections and as coolant supply blocks whereby all sub-coils are in a common circuit within the coils and may thus be connected to a common power source and common source of coolant. If each sub-coil or at least small groups of sub-coils are connected to the coolant supply in series, the coolant supplied to the sub-coil(s) is normally cooler than when the coolant is directed through a larger number of sub-coils before being withdrawn and returned to the coolant supply circuit. By this means the sub-coils are maintained at a lower temperature thereby giving increased electrical-conductivity and thus a greater magnetic flux within their core.

It is possible, in the improved series reactor, to add to, or to remove, coils or sub-coils to increase or decrease the inductance of the reactor to meet changing requirements and because of the provision of coils formed from separate sub-coils and because of the absence of oil cooling (and the necessity for the removal of oil before access can be obtained) these changes can be accomplished with the minimum of difficulty and with greater precision than in previously available series reactors.

By the use of an internally-circulated coolant, oil cooling is dispensed with together with the associated container, radiator(s), expansion tank(s) and explosion detection and prevention devices. Thus it is possible to reduce the weight of the reactor by a factor of about 5 or 6 and to achieve a consequent cost reduction. Because of this reduction in weight (and in volume) it may be possible to site the reactor much nearer the device giving rise to the unstable electrical load, for example a plasma gun, thereby substantially reducing the installation costs.

Where the electrical load requires a DC supply, the series reactor is connected to the load via a rectifier and because of the decrease in size and weight of the improved series reactor and the absence of oil cooling it is possible to incorporate the reactor and rectifier (if desired with a common liquid coolant system) into a single unit with a consequent increase in flexibility of lay-out.

The heat (of relatively low-grade) obtained as a heated liquid coolant is in an extremely convenient form for subsequent utilisation, for example in temperature control systems.

One embodiment of the present invention is shown diagrammatically in FIG. 1 of the attached drawings.

Figure 1:
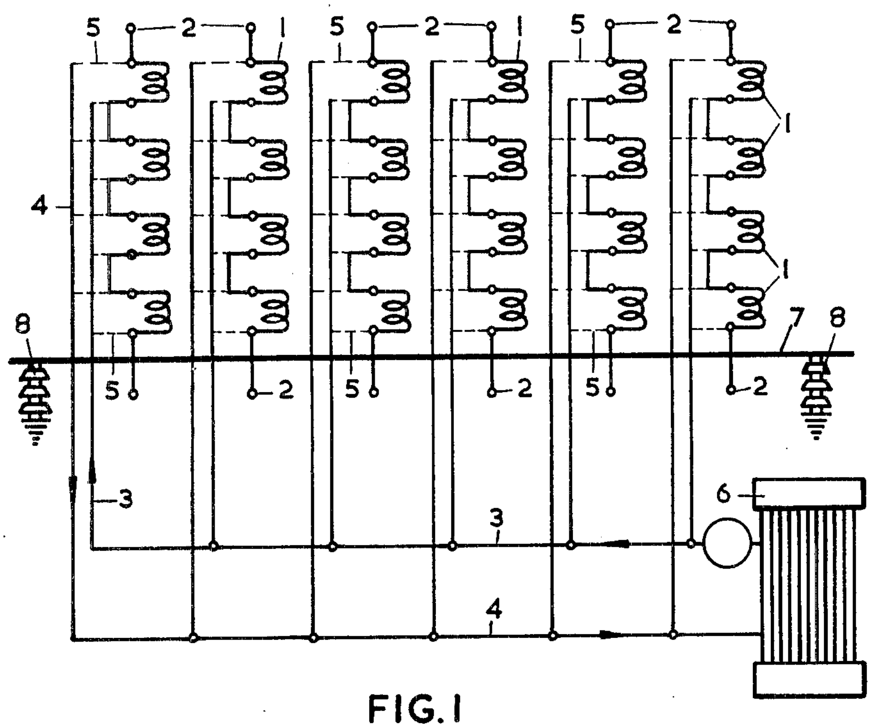

In FIG. 1, the sub-coils in the coils are indicated by 1, the electrical connections of the coils by 2 and the pipes for the coolant system by 3 (for the supply of coolant) and 4 (for the withdrawal of coolant) each of which is insulated by the use of a non-conducting connection 5. The coolant is circulated via a pump through heat exchanger 6 (which may be used to supply heat to other equipment, as desired). The coils are supported on base 7 which is insulated from earth by means of insulators 8.

Figure 2:
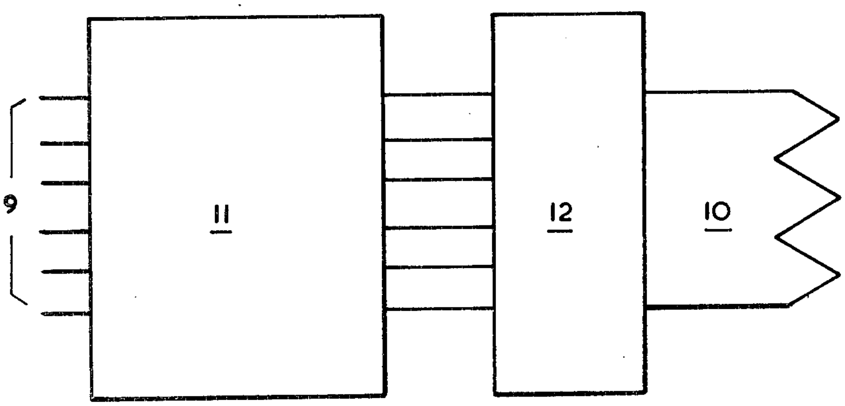
FIG. 2 shows a typical circuit in which a series reactor may be incorporated and FIG. 3 shows, also diagrammatically, the structure of a previously known series reactor (with oil cooling and associated equipment).

FIG. 2 shows diagrammatically a typical circuit from a multiphase power supply 9, an unstable electrical load 10 (for example, a plasma gun) and a series reactor 11. In this case, the electrical load requires DC and a rectifier 12 is incorporated in the circuit between the series reactor and electrical load to convert AC from the power source and series reactor to DC.

Figure 3:
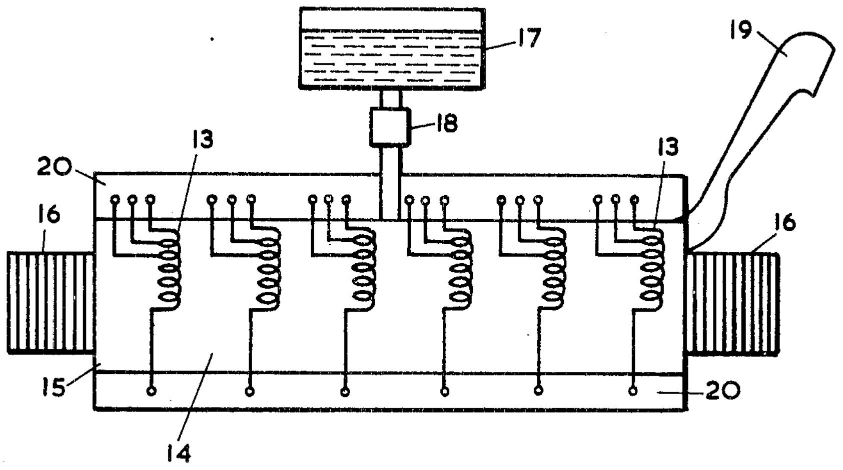

FIG. 3 shows a previously known series reactor wherein commonly used coils 13 are submerged in a body of oil 14 in a steel container 15. The oil is cooled by convection through radiators 16. There is also provided an expansion tank 17 below which is an explosion detection device 18. Provision is also made to discharge oil from the tank through vent 19 to lessen the effect of any explosion within the tank. There are normally required connection chambers 20 for tappings from the coils which hinders access to such tappings. No such connection chambers are required in the series reactors of the present invention.

Figure 4:
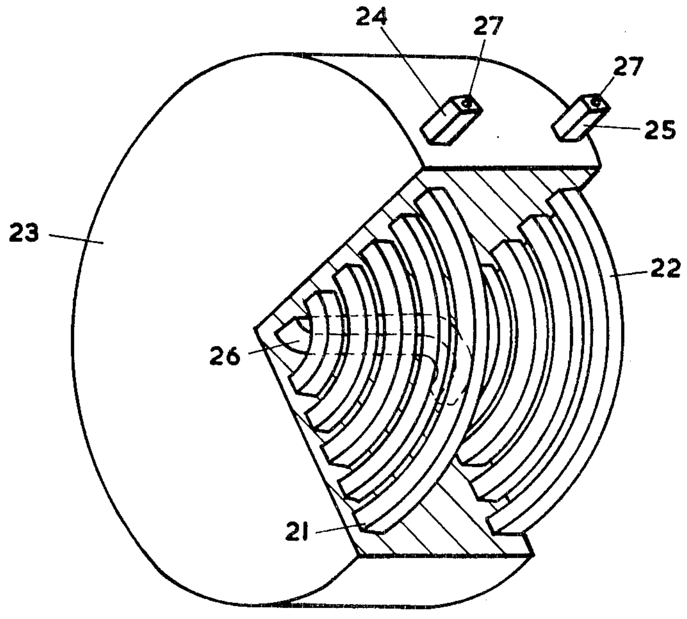
FIG. 4 shows the structure of a sub-coil with constituent spirals.

FIG. 4 shows a sub-coil consisting of spirals 21 and 22 embedded in resin 23 and with external connections 24 and 25 and internal connection 26 between the spirals made in such a manner that power supplied to the external connections passes in the same direction through both spirals. The passage for coolant through the spirals is shown by 27.

What is claimed is:

1. In a circuit comprising a multiphase power source connected to an unstable electrical load, the improvement comprising:

a multiphase series reactor connected between said multiphase power source and said unstable electrical load for controlling the power supplied to said unstable electrical load from said multiphase power source, said multiphase series reactor being connected in series with said multiphase power source and said unstable electrical load, said multiphase series reactor including a number of interconnected coils each of which surrounds a core consisting of a non-magnetically susceptible material, each of said interconnected coils being formed from sub-coils, each sub-coil consisting of a plurality of laterally spaced single plane spirals, each spiral being formed from hollow electrically conducting material, each sub-coil being wound in such a manner that electrical power supplied to the coil passes through the constituent spirals of the sub-coils in the same direction and coolant introduced into the interior of the hollow electrically conducting material forming a sub-coil passes through the spirals of the sub-coil before being withdrawn therefrom;

means for connecting said number of interconnected coils to said multiphase power source;

means for connecting said number of interconnected coils to said unstable electrical load;

means to introduce coolant through the interior of each sub-coil and to withdraw coolant therefrom.

2. A series reactor as claimed in claim 1 wherein a sub-coil comprises two laterally spaced single plane spirals.

3. A series reactor as claimed in claim 1 wherein the hollow electrically-conducting material forming the spirals is hollow metal tubing having a rectangular outer cross-section.

4. A series reactor as claimed in claim 3 wherein the hollow electrically-conducting material is hollow metal tubing having a square outer cross-section.

5. A series reactor as claimed in claim 3 wherein the hollow metal tubing has an external width in the range 5 to 13 mm and an internal circular passage having a diameter in the range 2.5 to 5 mm.

6. A series reactor as claimed in claim 1 wherein the sub-coils in each of said number of interconnected coils are connected in series.

7. A circuit as claimed in claim 1 wherein said unstable electrical load comprises a plasma gun for arc heating, said plasma gun comprising electrodes between which an arc can be formed, whereby said multiphase power source supplies power to said electrodes of said plasma gun through said multiphase series reactor.

8. A circuit as claimed in claim 7 wherein said means for connecting said number of interconnected coils to said unstable electrical load further comprises an AC/DC rectifier connected to said unstable electrical load in series with said multiphase series reactor, whereby said multiphase power source supplies power to said electrodes of said plasma gun through said multiphase series reactor and said AC/DC rectifier.

* * * * *